June 28, 1955
R. G. BUSH ET AL
2,711,585
DEVICE FOR CUTTING PLASTIC FOOD PRODUCTS INTO ARCUATE SHAPES OF SIMILAR SIZE AND WEIGHT
Filed June 28, 1954
2 Sheets-Sheet 1
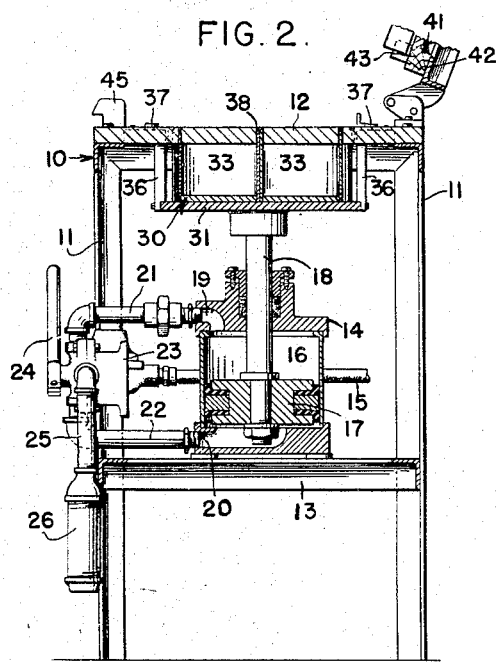
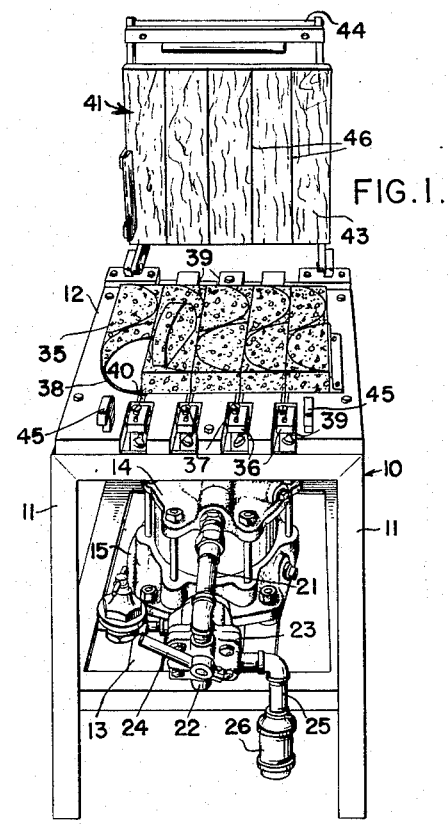
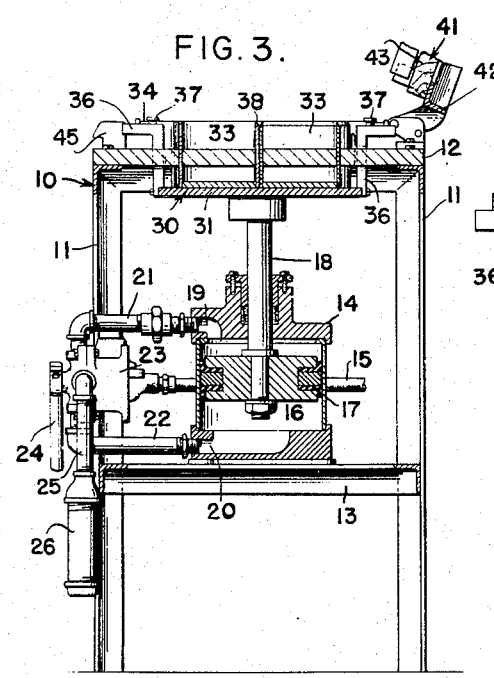
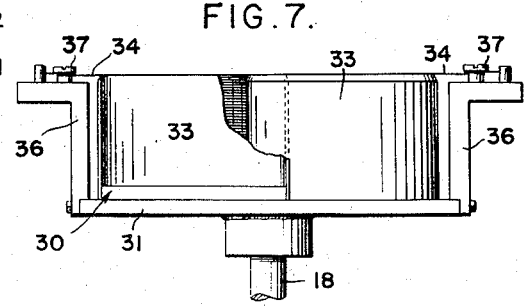
ROBERT G. BUSH
GILBERT H. HANNON
*INVENTORS*
BY Warren F. B. Lindsley
*ATTORNEY*

June 28, 1955
R. G. BUSH ET AL
2,711,585
DEVICE FOR CUTTING PLASTIC FOOD PRODUCTS INTO
ARCUATE SHAPES OF SIMILAR SIZE AND WEIGHT
Filed June 28, 1954
2 Sheets-Sheet 2
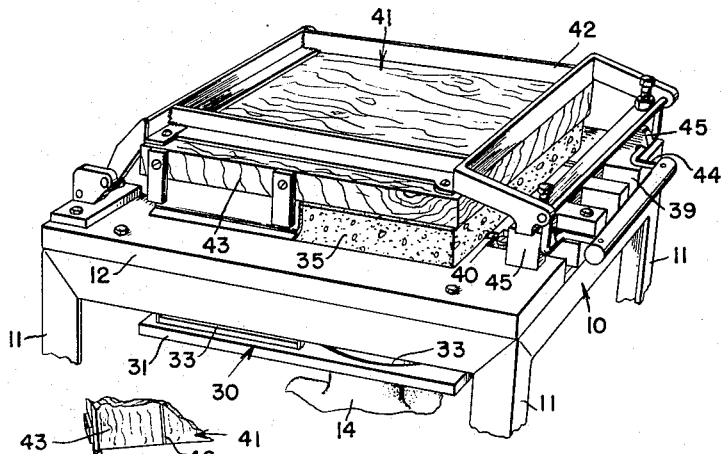
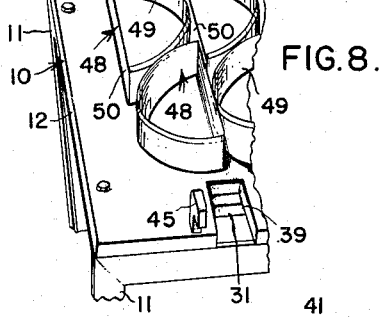
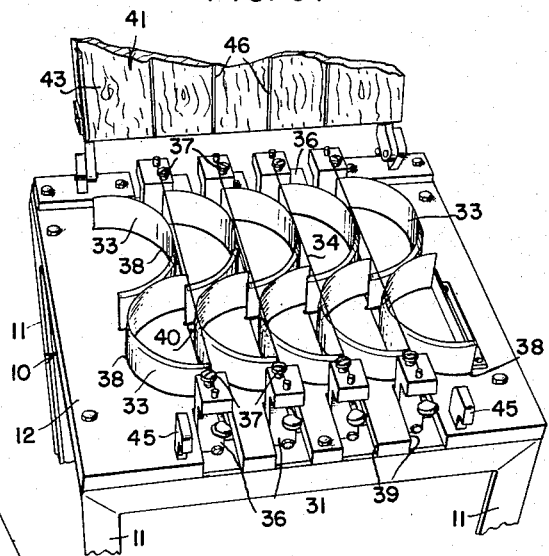
ROBERT G. BUSH
GILBERT H. HANNON
*INVENTORS*
BY
*ATTORNEY*

United States Patent Office 2,711,585
Patented June 28, 1955

2,711,585

DEVICE FOR CUTTING PLASTIC FOOD PRODUCTS INTO ARCUATE SHAPES OF SIMILAR SIZE AND WEIGHT

Robert G. Bush and Gilbert H. Hannon, Green Bay, Wis., assignors to L. D. Schreiber & Company, Inc., Green Bay, Wis.

Application June 28, 1954, Serial No. 439,594

13 Claims. (Cl. 31—30)

This invention relates to a cutting device for plastic food products and more particularly to new and improved cheese cutting equipment for forming arcuate blocks of cheese of substantially the same shape, size and weight from a block of natural cheese.

Natural cheese with its paraffined cloth and rind has all but disappeared from the grocer's display cases. In its place have appeared attractive packages of rindless cheese of convenient consumer sizes. The need for a consumer unit package of rindless natural cheese of similar shape, size and weight has been emphasized by mass merchandising. The shape, size and weight of the cheese must attract attention and be such as to enable easy handling, pricing and display.

Heretofore most traditional cuts of natural cheese were furnished to the trade in standard weights cut from a rectangular block of natural cheese. Half moon shaped blocks of cheese were cut by hand usually from a Longhorn. The demand for half moon shaped cheese products, however, increased to the point where mass producing of an arcuate moon shaped block of natural cheese of a constant weight is needed and demanded by the merchandiser.

Therefore, in accordance with the invention claimed, a new and improved cheese slicing machine is provided for cutting arcuate blocks of cheese of substantially the same shape, size and weight from a block of cheese of a given thickness. The slicing machine comprises a frame, a reciprocating slicer head mounted on the frame, a cheese supporting surface mounted on the frame, and means for holding the cheese against the supporting surface in position to be sliced during the reciprocating movement of the head. The slicer head may comprise a plurality of endles scutting blades mounted on a base plate and arranged to slice arcuate blocks of cheese or arcuate cutting blades mounted on a base plate with slicing wires mounted across the ends of the blades. The arcuate cutting blades may comprise cylindrical surfaces secured at one edge to the base plate and formed at the opposite edge with cutting edges. The slicing wires are then connected across the ends of the cutting edges. The holding means comprises a stop plate arranged on the side of the cheese opposite the blades of the slicer head. Means are provided for actuating the slicer head in one direction to cause the cutter blades and the slicing wires where used to cut through the block of cheese and abut against the stop plate.

It is, therefore, one object of the present invention to provide a new and improved slicing machine for plastic food products.

Another object of this invention is to provide a new and improved cheese slicing machine in which arcuate blocks of cheese of substantially the same shape, size and thickness are cut from a given block of cheese.

A further object of this invention is to provide a new and improved cheese slicing machine in which a plurality of cutter blades are so arranged that the maximum number of arcuate or half moon shaped blocks of cheese are cut from a given block of natural cheese with a minimum of waste.

A still further object of this invention is to provide a new and improved method of cutting arcuate blocks of cheese of substantially the same shape, size and weight from a block of natural cheese.

Objects and advantages other than those above set forth will be apparent from the following description when read in connection with the accompanying drawings, in which:

Fig. 1 is a perspective view of a cheese slicing machine embodying the invention with the cheese clamping device rotated ninety degrees clockwise from its closed position and with an arcuate block of sliced cheese placed on end;

Fig. 2 is a view partly in cross section of the cheese slicing machine illustrated in Fig. 1 and showing the slicer head in its lower retracted position;

Fig. 3 is a view partly in cross section of the cheese slicing machine illustrated in Fig. 1 and showing the slicer head in its upper cheese slicing position;

Fig. 4 is an enlarged perspective view of the table supporting and cheese holding means illustrated in Fig. 1 with a block of cheese clamped in cheese slicing position;

Fig. 5 is an enlarged perspective view of the table supporting means illustrated in Fig. 1 with the slicer head in its upper cheese slicing position;

Fig. 6 is an enlarged perspective view of the table supporting means illustrated in Fig. 1 with the cheese slicer head in its lowered retracted position;

Fig. 7 is an enlarged view partly in cross section of the slicer head shown in Fig. 5; and Fig. 8 is a partial view of a modification of the slicer head shown in Figs. 2, 3, 5 and 7.

Referring more particularly to the drawings by characters of reference, Figs. 1 to 3 illustrate a slicing machine for plastic food products such as natural cheese comprising a frame 10 forming a plurality of legs 11, a table top, product or cheese supporting means 12, and a shelf 13 arranged below the cheese supporting means 12 for supporting a suitable slicer head actuating means such as fluid actuating means 14. The actuating means 14 is illustrated as a fluid motor actuable in two directions by fluid under pressure, which will be assumed herein to be compressed air, supplied from a suitable compressor (not shown) through a pipe 15. Although the actuating means 14 is herein shown as a fluid motor, an electric motor with suitable reversing means or hand operated linkage may also be used.

The fluid motor 14 comprises a cylinder 16, piston 17 and piston rod 18. Cylinder 16 is provided with orifices 19 and 20. Orifices 19 and 20 are connected by pipes 21 and 22, respectively, to a suitable valve 23. Valve 23, by means of a control handle 24, connects the source of fluid under pressure to either pipe 21 and orifice 19, or pipe 22 and orifice 20, depending on the desired direction of operation of piston 17 and piston rod 18, as is well known in the art. A pipe 25 connected to valve 23 is connected through muffler 26 to atmosphere. Valve 23 connects cylinder 16, on one side of piston 17, of fluid motor 14, to the source of fluid under pressure and simultaneously connects cylinder 16 on the opposite side of piston 17 to pipe 25, muffler 26 to atmosphere. Fluid motor 14 is arranged for rapid reversal action by draining the downstream side of cylinder 16 upon actuation of fluid motor 14.

The fluid motor 14 is provided to reciprocate a slicer head 30 mounted on frame 11. The slicer head 30, shown as reciprocating vertically, may equally well be reciprocated in any other direction and comprises a base plate 31 suitably connected to piston rod 18 and a plurality of arcuate shaped cutter means. The cutter means comprise a plurality of cutter blades 33 mounted on base plate 31. As shown in Fig. 7, the cutter blades comprise a plurality of cylindrical surfaces each secured at one edge to base plate 31 and formed at the other edge with suitable cutting edges. Slicing wires 34 are arranged to extend across the ends of the cutting edges of blades 33 to form with each cylindrical surface an endless cutting edge surrounding an arcuate area. In order to cut as many arcuate blocks of cheese out of a given slab of natural cheese 35 as possible, the cylindrical surfaces forming cutter blades 33 are arranged to extend in rows so that a single slicing wire 34 may extend across a number of cutter blades (as shown in Figs. 1, 5 and 6).

Each slicing wire 34 is mounted on base plate 31 between a pair of L-shaped upright members 36. Members 36 are bolted to base plate 31 so as to extend above the plate and perpendicularly thereto with the right angle arms of members 36 extending above and away from the center of the plate. Wires 34 are arranged to extend between members 36 and are provided with adjustment means 37 to vary their tension.

As shown in Fig. 5, the cylindrical surfaces of cutter blades 33 in the lower row are aligned to all present cavities in a single direction toward the right of the figure while the cylindrical surfaces of the cutter blades 33 in the upper row are aligned to all present cavities in a single direction toward the left. The slicing wires 34 are each arranged to extend across the ends of the cutting surfaces of adjacent cutter blades 33 which present cavities in opposite directions. These adjacent cutter blades are those blades which have cylindrical surfaces which abut a common plane extending substantially transversely to the ends of the cylinders. These adjacent cutter blades each have an end abutting the plane extending between the ends of the other cutter blade. In this manner the maximum number of arcuate blocks of cheese may be obtained out of a given block of natural cheese.

The slicer head 30 is arranged below the table top or cheese supporting means 12. Supporting surface or means 12 is provided with a plurality of arcuate perforations 38 which provide passageways for the cylindrical surfaces of the cutter blades 33 to pass at least partly therethrough upon actuation thereof in cheese cutting direction. Supporting means 12 is further provided with slots 39 which are arranged to provide openings for the members 36 to extend therethrough. In the lower or retracted position of the slicer head 30 the top of the members 36 extend slightly above the top plane of supporting means 12. Grooves 40 are provided in the top of supporting means 12 to receive the slicing wires 34 when the slicer head is in the retracted position. Thus, the cutter blades 33 pass into perforations 38 and the slicing wires 34 into grooves 40 and are below the surface of the supporting means when in the retracted position and do not hinder in any way the removing or placing of cheese upon this table top.

A holding means 41 comprising a rotatable mounted table top extension frame 42 and stop plate 43 is pivotally mounted on one edge of supporting means 12. Stop plate 43 in the cheese clamped position is arranged on the side of the cheese opposite the blades 33. In the unclamped position the holding means may be left in the upright position shown in Fig. 1 or may be rotated to a horizontal position (not shown) adjacent supporting means 12 where it forms a working surface or table top extension for the cheese supporting means 12. In the clamped or locked position shown in Fig. 4 (i. e. a horizontal position adjacent top 12 obtained by rotating the extension frame one hundred eighty degrees from its horizontal unclamped position) a pivotally mounted clamp 44 engages a stop 45 and firmly secures the holding means and cheese block 35 in slicing position, i. e., cheese block 35 is held against the supporting means 12 in position to be sliced during the reciprocating movement of slicer head 30. A plurality of grooves 46 may be formed in stop plate 43 of the holding means 41 so that slicing wires 34 may extend beyond the upper surface of the cheese during a slicing operation.

In accordance with the invention claimed, a block of natural cheese of a predetermined thickness is placed upon the table top or supporting means 12 and is firmly held thereto by holding means 41. Upon a predetermined rotation of handle 24 of valve 23 fluid under pressure is supplied from the source through pipe 15, valve 23, pipe 22, orifice 20 and into cylinder 16 under piston 17. Simultaneously therewith fluid under pressure above piston 17 in cylinder 16 is exhausted through orifice 19, pipe 21, valve 23, pipe 25 and muffler 26 to atmosphere. The fluid under pressure actuates piston 17 and piston rod 18 upward to force the cutter blades upward through the perforations in surface 12. Further upward movement of the slicer head 30 causes the slicing wires 34 and the cutter blades 33 into and through the block of cheese 35 until the wires enter grooves 46 and the cutter blades abut the surface of stop plate 43. Upon a further predetermined rotation of handle 24 of valve 23, fluid under pressure from the source is directed through pipe 15, valve 23, pipe 21, orifice 19 and into cylinder 16 above piston 17 to force piston 17, piston rod 18 and slicer head 30 to its lower or retracted position. Simultaneously with the actuation of piston 17 to its lower or retracted position fluid under pressure below piston 17 is exhausted through orifice 20, pipe 22, valve 23, pipe 25 and muffler 26 to atmosphere.

Although the slicer head 30 shown in Figs. 2, 3, 5 and 7 employs a slicing wire 34 to form an endless cutting edge, it is within the scope of this invention to provide any form of endless cutting blade to form or slice arcuate blocks of plastic food products. Fig. 8 illustrates an arcuate cutter blade 48 which is formed by a cylindrical surface 49 secured at one edge to base plate 31 and formed at the other edge with cutting edges and means comprising a rectangular cutting surface 50 arranged to extend between the ends of cylindrical surface 49 to form an endless cutting edge surrounding an arcuate area. Means 50 may comprise a rectangular surface completely covering the ends of cylindrical surface 49 or may be of any width but extending between the ends of cylindrical surface 49 to form with cylindrical surface 49 an endless arcuate cutting edge. Cutter blade 48 may be formed from a single piece of material suitably shaped to form the arcuate cutting member shown in Fig. 8.

This new and improved cheese slicing device and method of slicing cheese cuts a plurality of arcuate blocks of half moon shaped pieces of cheese of the same shape, size and weight out of a given block of natural cheese. These attractively formed half moon shaped blocks of cheese may be shipped to a retailer who needs to weigh only one piece of a given quantity of cheese blocks to set the consumer's price and then may market the rest of the cheese blocks without further attention to weight. In mass merchandising of cheese this is a time and money saving feature over the prior art.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A slicing machine for food products comprising a frame, a reciprocating slicer head mounted on said frame, said slicer head comprising a base plate, a plurality of arcuate cutter blades mounted on said base plate and slicing wires mounted across the ends of said blades, a product supporting surface mounted on said frame, means for holding the product against said surface in position to be sliced during the reciprocating movement of said head, said holding means comprising a stop plate arranged on the side of the product opposite the blades, and means for actuating said head in one direction to cause said blades and said wires to abut said stop plate.

2. A slicing machine for food products comprising a frame, a reciprocating slicer head mounted on said frame, said slicer head comprising a base plate, a plurality of arcuate cutter blades mounted on said base plate and slicing wires mounted across the ends of said blades, a product supporting surface mounted on said frame and provided with arcuate perforations for providing passageways through said surface for said blades, means for holding the product against said surface on the side of said surface opposite said blades and in position to be sliced during the reciprocating movement of said head, said holding means comprising a stop plate arranged on the side of the product opposite said blades, and means for actuating said head in one direction to cause said blades to pass through said perforations and said blades and said wires to abut said stop plate.

3. A slicing machine for plastic food products comprising a frame, a horizontally arranged table top mounted on said frame, a vertically reciprocating slicer head mounted on said frame below said table top and comprising a base plate, a plurality of arcuate cutter blades mounted on said base plate and slicing wires mounted across the ends of said blades, said table top being perforated for providing passageways therethrough for said blades, means for holding the product on said table top in position to be sliced during the reciprocating movement of said head, said holding means comprising a stop plate arranged on the side of the product opposite said blades, and means for actuating said head in one direction to cause said blades to pass through said perforations and said blades and wires to pass through the product and abut said stop plate.

4. A cheese slicing machine comprising a frame, a reciprocating slicer head mounted on said frame, said slicer head comprising a base plate, a plurality of arcuate cutter blades mounted on said base plate and slicing wires mounted across the ends of said blades, said blades being aligned so that each wire extends across the ends of more than one blade, a member having a cheese supporting surface mounted on said frame and provided with arcuate perforations for providing passageways through said surface for said blades, means for holding a block of cheese against said surface on the side of said surface opposite said blades and in position to be sliced during the reciprocating movement of said head, said holding means comprising a stop plate arranged on the side of the cheese opposite said blades, and means for actuating said head in one direction to cause said blades to pass through said perforations and said blades and said wires to abut said stop plate.

5. A cheese slicing machine comprising a frame, a reciprocating slicer head mounted on said frame, said slicer head comprising a base plate and a plurality of cutter blades mounted on said base plate, said blades comprising cylindrical surfaces each secured at one edge to said base plate and formed at the opposite edge with a cutting edge, and cutting means connecting the ends of said cutting edges to form a plurality of endless cutting edges surrounding arcuate areas, a member having a cheese supporting surface mounted on said frame and provided with perforations for providing passageways through said surface for at least a part of each of said endless cutting edges, means for holding the cheese against said surface in position to be sliced during the reciprocating movement of said head, said holding means comprising a stop plate arranged on the side of the cheese opposite said blades, and means for actuating said head in one direction to cause at least part of said endless cutting edges to pass through said perforations to abut said stop plate.

6. A cheese slicing machine comprising a frame, a reciprocating slicer head mounted on said frame, said slicer head comprising a base plate and a plurality of cutter blades mounted on said base plate, said blades comprising cylindrical surfaces secured at one edge to said base plate and formed at the opposite edge with cutting edges and slicing wires mounted across the ends of said cutting edges, a member having a cheese supporting surface mounted on said frame and provided with perforations for providing passageways through said surfaces for said blades, means for holding a block of cheese of a predetermined thickness against said surface in position to be sliced during the reciprocating movement of said head, said holding means comprising a stop plate arranged on the side of the cheese opposite said blades, and means for actuating said head in one direction to cause said blades to pass through said perforations and said blades and said wires to abut said stop plate.

7. A slicing machine for cutting arcuate blocks of cheese of substantially the same shape, size and thickness from a block of cheese having a predetermined thickness comprising a frame, a horizontally arranged table top mounted on said frame, a vertically reciprocating slicer head mounted on said frame below said table top and comprising a base plate and a plurality of cutter blades mounted on said base plate, each of said blades comprising a cylindrical surface secured at one edge to said base plate and formed at the opposite edge with cutting edges and slicing wires mounted across the ends of said cutting edges, said table top being perforated for providing passageways therethrough for said blades, means comprising a stop plate for holding the cheese on said table top in position to be sliced during the reciprocating movement of said head, said stop plate being arranged on the side of the cheese opposite said blades, and means for actuating said head in one direction to cause said blades to pass through said perforations and said blades and wires to pass through the cheese and abut said stop plate.

8. A slicing machine for cutting arcuate blocks of cheese of substantially the same shape, size and thickness from a block of cheese comprising a frame, a horizontally arranged table top mounted on said frame, a vertically reciprocating slicer head mounted on said frame below said table top and comprising a base plate and a plurality of cutter blades mounted on said base plate, each of said blades comprising a cylindrical surface secured at one edge to said base plate and formed at the opposite edge with cutting edges and slicing wires mounted across the ends of said cutting edges, said table top being perforated for providing passageways therethrough for said blades, means for holding the cheese on said table top in position to be sliced during the reciprocating movement of said head, said holding means comprising a stop plate arranged on the side of the cheese opposite said blades, and means for actuating said head in one direction to cause said blades to pass through said perforations and said blades and wires to pass through the cheese and abut said stop plate and for actuating said blades and said wires in another direction to cause said blades to pass into said perforations and said wires against said table top.

9. A slicing machine for cutting arcuate blocks of cheese of substantially the same shape, size and thickness from a block of cheese comprising a frame, a horizontally arranged table top mounted on said frame, a vertically reciprocating slicer head mounted on said frame below said table top and comprising a base plate and a plurality of cutter blades mounted on said base plate, each of said blades comprising a cylindrical surface secured at one edge to said base plate and formed at the opposite edge with cutting edges and slicing wires mounted across the ends of said cutting edges, said table top being perforated for providing passageways therethrough for said blades, means for holding the cheese on said table top in position to be sliced during the reciprocating movement of said head, said holding means comprising a rotatable mounted table top extension frame pivotally mounted on one edge of said table top and rotatable 180 degrees from a horizontal position adjacent said table top to a horizontal position above said table top, said table top extension when in the cheese holding position forming a stop plate arranged on the side of the cheese opposite said blades, and means for actuating said head in one direction to cause said blades and said wires to slice the cheese and abut said stop plate.

10. A slicing machine for cutting arcuate blocks of cheese of substantially the same shape, size and thickness from a block of cheese comprising a frame, a horizontally arranged table top mounted on said frame, a vertically reciprocating slicer head mounted on said frame below said table top and comprising a base plate and a plurality of cutter blades mounted on said base plate, each of said blades comprising a cylindrical surface secured at one edge to said base plate and formed at the opposite edge with cutting edges and slicing wires mounted across the ends of said cutting edges, said table top being perforated for providing passageways therethrough for said blades, means for holding the cheese on said table top in position to be sliced during the reciprocating movement of said head, said holding means comprising a rotatable mounted table top extension frame pivotally mounted on one edge of said table top and rotatable 180 degrees from a horizontal position adjacent said table top to a horizontal position above said table top, said table top extension when in the cheese holding position forming a stop plate arranged on the side of the cheese opposite said blades, said stop plate being grooved to receive said wires, and means for actuating said head in one direction to cause said blades to pass through said perforations, the cheese and abut said stop plate and said wires to pass through the cheese and into said grooves of said stop plate.

11. A slicing machine for cutting arcuate blocks of cheese of substantially the same shape, size and weight comprising a frame, a horizontally arranged table top mounted on said frame, a vertically reciprocating slicer head mounted on said frame below said table top and comprising a base plate and a plurality of cutter blades mounted on said base plate, each of said blades comprising a cylindrical surface secured at one edge to said base plate and formed at the opposite edge with cutting edges, said table top being perforated for providing passageways therethrough for said blades and said blades being arranged in said passageways when in the slicer head retracted position, slicing wires mounted on said base plate to extend across the top of said table top and across the ends of said cutting edges, means for holding the cheese on said table top in position to be sliced during the reciprocating movement of said head, said holding means comprising a stop plate arranged on the side of the cheese opposite said blades, and means for actuating said head in one direction to cause said blades and said wires to pass through the cheese and abut said stop plate.

12. A slicing machine for food products comprising a frame, a reciprocating slicer head mounted on said frame, said slicer head comprising a base plate and a plurality of cutter blades mounted on said base plate, said blades each comprising a cutter surface arranged to form an endless cutting edge surrounding an arcuate area, a product supporting surface mounted on said frame, means for holding the product against said surface in position to be sliced during the reciprocating movement of said head, said holding means comprising a stop plate arranged on the side of the product opposite the blades, and means for actuating said head in one direction to cause said blades to abut said stop plate.

13. A slicing machine for food products comprising a frame, a horizontally arranged table top mounted on said frame, a vertically reciprocating slicer head mounted on said frame below said table top and comprising a base plate and a plurality of cutter blades mounted on said base plate, said blades each comprising a cutter surface arranged to form an endless cutting edge surrounding an arcuate area, said table top being perforated for providing passageways therethrough for said blades, means for holding the product on said table top in position to be sliced during the reciprocating movement of said head, said holding means comprising a stop plate arranged on the side of the product opposite said blades, and means for actuating said head in one direction to cause said blades to pass through said perforations, the product and abut said stop plate.

References Cited in the file of this patent

UNITED STATES PATENTS

| 1,809,165 | Hart | June 9, 1931 |
| 2,439,840 | Buroff | Apr. 20, 1948 |